United States Patent
Xu et al.

(10) Patent No.: US 12,514,160 B2
(45) Date of Patent: Jan. 6, 2026

(54) LOCATING PICKING POINTS OF ANOMALIES

(71) Applicant: International Business Machines Corporation, Armonk, NY (US)

(72) Inventors: Jian Xu, Shanghai (CN); Guo Qiang Hu, Shanghai (CN); Yuan Yuan Ding, Shanghai (CN); Fan Li, Shanghai (CN); Jinfeng Li, Shanghai (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 17/106,597

(22) Filed: Nov. 30, 2020

(65) Prior Publication Data

US 2022/0167558 A1 Jun. 2, 2022

(51) Int. Cl.
*A01D 46/30* (2006.01)
*G06F 18/23213* (2023.01)
(Continued)

(52) U.S. Cl.
CPC ....... *A01D 46/30* (2013.01); *G06F 18/23213* (2023.01); *G06T 7/0012* (2013.01);
(Continued)

(58) Field of Classification Search
CPC . A01D 46/30; G06F 18/23213; G06T 7/0012; G06T 7/11; G06T 2210/12;
(Continued)

(56) References Cited

U.S. PATENT DOCUMENTS

| 6,091,846 A * | 7/2000 | Lin | H01L 22/20 |
| | | | 382/168 |
| 2018/0369872 A1* | 12/2018 | Mcgarvey | G06V 10/255 |

(Continued)

FOREIGN PATENT DOCUMENTS

| CN | 101680844 A | * | 3/2010 | | B07C 5/3422 |
| CN | 110175581 A | * | 8/2019 | ......... | G01N 21/3504 |

(Continued)

OTHER PUBLICATIONS

R. Kumar, S. Lal, S. Kumar and P. Chand, "Object detection and recognition for a pick and place Robot," Asia-Pacific World Congress on Computer Science and Engineering, Nadi, Fiji, 2014, pp. 1-7, doi: 10.1109/APWCCSE.2014.7053853. (Year: 2014).*

(Continued)

*Primary Examiner* — Sumati Lefkowitz
*Assistant Examiner* — Aaron Joseph Sorrin
(74) *Attorney, Agent, or Firm* — Caleb Wilkes; Andrew D. Wright; Calderon Safran & Wright P.C.

(57) ABSTRACT

A processor may receive an image of the collection of material having a plurality of objects. The processor may identify the anomaly from the plurality of objects. The processor may generate a bounding box for the anomaly. The processor may generate one or more picking points on the anomaly. The one or more picking points may be configured on at least one balance points of the anomaly. The processor may remove the anomaly from the collection of material via the one or more picking points.

20 Claims, 7 Drawing Sheets

(51) Int. Cl.
*G06T 7/00* (2017.01)
*G06T 7/11* (2017.01)
*G06V 20/10* (2022.01)
*G06V 20/68* (2022.01)

(52) U.S. Cl.
CPC .............. *G06T 7/11* (2017.01); *G06V 20/188* (2022.01); *G06T 2210/12* (2013.01); *G06V 20/68* (2022.01)

(58) Field of Classification Search
CPC ........ G06T 2207/30128; G06T 7/0006; G06V 20/188; G06V 20/68; G06V 10/26; B07C 5/3422; B07C 2501/0063
See application file for complete search history.

(56) References Cited

U.S. PATENT DOCUMENTS

| | | | |
|---|---|---|---|
| 2019/0261566 A1 | 8/2019 | Robertson | |
| 2019/0366539 A1* | 12/2019 | Arisoy | .................... B25J 9/1612 |
| 2020/0020093 A1* | 1/2020 | Frei | ........................ G05D 1/0246 |
| 2020/0175673 A1 | 6/2020 | Wen | |
| 2021/0069904 A1* | 3/2021 | Duan | ..................... B25J 9/1653 |

FOREIGN PATENT DOCUMENTS

| | | | | |
|---|---|---|---|---|
| CN | 111844101 A | 10/2020 | | |
| CN | 111932490 A | 11/2020 | | |
| DE | 102021128867 A1 | 6/2022 | | |
| GB | 2471885 A * | 1/2011 | ........... | B07C 5/3422 |
| GB | 2602553 A | 7/2022 | | |
| JP | 2019-029021 A | 2/2021 | | |
| JP | 2022-087042 A | 6/2022 | | |
| WO | 2018/221033 A1 | 12/2018 | | |
| WO | WO-2020021307 A1 * | 1/2020 | .......... | B25J 11/0005 |
| WO | WO-2021128747 A1 * | 7/2021 | ............... | G06T 7/11 |

OTHER PUBLICATIONS

J. Sousa, A. Rebelo and J. S. Cardoso, "Automation of waste sorting with deep learning", Proc. 15th Workshop de Visão Computacional (WVC), pp. 43-48, Sep. 2019. (Year: 2019).*
WO-2021128747-A1—Original and English Translation (Year: 2021).*
CN-101680844-A1—Original and English Translation (Year: 2010).*
Platt, R., Learning and Generalizing Control-Based Grasping and Manipulation Skills, Ph.D. Dissertation, Computer Science Department, University of Massachusetts at Amherst, Sep. 2006. (Year: 2006).*
Q. V. Le, D. Kamm, A. F. Kara and A. Y. Ng, "Learning to grasp objects with multiple contact points," 2010 IEEE International Conference on Robotics and Automation, Anchorage, AK, USA, 2010, pp. 5062-5069, doi: 10.1109/ROBOT.2010.5509508. (Year: 2010).*
R. Pelossof, A. Miller, p. Allen and T. Jebara, "An SVM learning approach to robotic grasping," IEEE International Conference on Robotics and Automation, 2004. Proceedings. ICRA '04. 2004, New Orleans, LA, USA, 2004, pp. 3512-3518 vol. 4, doi: 10.1109/ROBOT.2004.1308797. (Year: 2004).*
E. Chinellato, R. B. Fisher, A. Morales and A. P. del Pobil, "Ranking planar grasp configurations for a three-finger hand, " 2003 IEEE International Conference on Robotics and Automation (Cat. No. 03CH37422), Taipei, Taiwan, 2003, pp. 1133-1138 vol. 1, doi: 10.1109/ROBOT.2003.1241745. (Year: 2003).*
CN-110175581-A: English Translation (Year: 2019).*
Huang, et al., "Towards automated strawberry harvesting: Identifying the picking point." Accessed Jun. 23, 20. 16 pages. In Towards Autonomous Robotic Systems (pp. 222-236). SpringerVerlag Berlin Heidelberg. Published by OpenAccess. https://kclpure.kcl.ac.uk/portal/files/76548255/strawberry.pdf.
Mell, et al., "The NIST Definition of Cloud Computing," Recommendations of the National Institute of Standards and Technology, U.S. Department of Commerce, Special Publication 800-145, Sep. 2011, 7 pgs.
Robotics Online Marketing Team. "Pick and Place Robots: What Are They Used For and How Do They Benefit Manufacturers?" Published Mar. 13, 2018. 5 pages. Published by Robotic Industries Association. https://www.robotics.org/blog-article.cfm/Pick-and-Place-Robots-What-Are-They-Used-For-and-How-Do-They-Benefit-Manufacturers/88.
Subramaniam, et al., "Edible Bird Nest Processing using Machine Vision and Robotic Arm." Published Jan. 5, 2015. 4 pages. Published in Jurnal Teknologi. 72:2. pp. 85-88. Published by Universiti Teknologi Malaysia. https://doi.org/10.11113/jt.v72.3889.
Xiong, et al., "An autonomous strawberry-harvesting robot: Design, development, integration, and field evaluation." Published Aug. 7, 2019. 23 pages. Publishd by Wiley Online Library. https://doi.org/10.1002/rob.21889.
Zhihong et al., "A Vision-based Robotic Grasping System Using Deep Learning for Garbage Sorting," IEEE, Proceedings of the 36th Chinese Control Conference (CCC), 2017, pp. 11223-11226.
Pan et al., "Manipulator Package Sorting and Placing System Based on Computer Vision," IEEE, In the Proceedings of Chinese Control And Decision Conference (CCDC), Aug. 2020, pp. 409-414.
Francisco Garcia, "Toy Picker Robot using Arduino and Rapsberry Pi," Youtube, Published Mar. 27, 2019, URL: https:// www.youtube.com/watch?v=f3s_uub4P6Q, Printed Jan. 31, 2024, pp. 1-3.
Shin et al., "Integration of deep learning-based object recognition and robot manipulator for grasping objects," IEEE, In the Proceedings of the 16th International Conference on Ubiquitous Robots (UR), 2019, pp. 174-178.
Vohra, et al., "Real-time Grasp Pose Estimation for Novel Objects in Densely Cluttered Environment," IEEE, 28th IEEE International Conference on Robot and Human Interactive Communication (RO-MAN), 2019, pp. 1-6.
Zhang et al., "Robotic grasp detection based on image processing and random forest," Multimedia Tools and Applications, Jan. 2020, vol. 79, No. 3-4, pp. 2427-2446.
"Segmentation," (image processing), Wikipedia, the free encyclopedia, Jun. 10, 2020, Url: https://de.wikipedia.org/wiki/Segmentierung_ (image processing), Printed on Feb. 6, 2024, 1 page.
Japan Patent Office, "Notice of Reasons for Refusal" Feb. 25, 2025, 06 Pages, JP Application No. 2021-189185.

* cited by examiner

LOCATING PICKING POINTS OF ANOMALIES

BACKGROUND

The present disclosure relates generally to the field of sorting material, and more particularly to removing irregular material from a collection of material.

Many industries rely on sorting raw materials during product production. While various sorting methods exist, often such methods are unable to remove all necessary irregular shaped material. Failure to remove all the irregular shaped material can result in a decrease in the value of the final product and can ultimately result in the breakdown of equipment when the irregular shaped materials become caught in the equipment.

SUMMARY

Embodiments of the present disclosure include a method, computer program product, and system for removing an anomaly from a collection of material. A processor may receive an image of the collection of material having a plurality of objects. The processor may identify the anomaly from the plurality of objects. The processor may generate a bounding box for the anomaly. The processor may generate one or more picking points on the anomaly. The one or more picking points may be configured on at least one balance points of the anomaly. The processor may remove the anomaly from the collection of material based on the one or more picking points.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of removing anomalies form a material, and more particularly to identifying picking points associated with the anomalies to allow for proper removal. While the present disclosure is not necessarily limited to such applications, various aspects of the disclosure may be appreciated through a discussion of various examples using this context.

Traditional removal systems often use robotic means (e.g., robotic arms) to remove impurities from various types of material (e.g., tea leaves and herbal medicine components). These traditional systems identify impurities by visual inspection and can identify a picking point using a combination of a bounding box and segmentation computations. Often, these methods generate a picking point that is not located on the impurity (e.g., anomaly or undesirable material) or the picking point is located on a distal portion of the impurity. When a picking point is generated that is not located on the impurity, the picking point fails. In some situations, such picking point failures are due to the unique shape of the impurity or anomaly and the inability to correctly estimate where a picking point would be successful during impurity removal. When an impurity/anomaly is not removed, the undesirable material can result in an undesirable consumer product having one or more impurities/anomalies. As such, a method for determining more accurate and successful picking points is necessary.

In embodiments, a picking point system can be configured to identify if an object in the material is an impurity or anomaly. When an impurity/anomaly is identified, the picking point system can detect the bounding box of the object (e.g., impurity/anomaly) and determine the overall size of the bounding box. In embodiments where the size of the bounding box is below a threshold area, the picking point system can generate a picking point (e.g., at the center of the bounding box) and configure the robotic means to remove the impurity/anomaly. In embodiments where the size of the bounding box is above a threshold size, the picking point system can be configured to determine the segmentation (e.g., using unsupervised segmentation) of the impurity/anomaly.

In embodiments, where segmentation of the impurity/anomaly is demonstrated by points, the picking point system can gather the resulting points into one or more connected areas (e.g., using statistical methods, such as DBSCAN). In embodiments where segmentation of the impurity/anomaly is demonstrated by another shape (e.g., polygons), each depicted shape can be configured into one connected area. In these embodiments, picking points system can be configured to use machine learning principles (e.g., k-centroid clustering) to compute the number of picking points.

Embodiments discussed herein can be used in a variety of implementations. One exemplary embodiment, for example, can include removing impurities (e.g., anomalies) when processing tea leaves for consumption. In many places, tea plants are grown in fields and the tea leaves are harvested from the tea plants. Despite various efforts (e.g., filtering), often, impurities (e.g., including any undesirable plant matter that is not tea leaves) and/or foreign matter (e.g., rocks and fibers) can be coincidently collected with the tea leaves.

As such, the impurities and/or foreign matter included in the tea leaves must be removed before the tea leaves can be further processed. Often if such impurities and/or foreign matter (e.g., anomalies) are not removed from the collected material, such anomalies can result in an inferior product or production delays when the impurity or anomaly affects the processing equipment. For example, if a rock or piece of wire is mixed in the tea leaves, and such matter is not timely removed, could result in the rock or wire breaking or becoming lodged in the tea processing equipment. As such, an accurate method for detecting such anomalies (e.g., impurities and foreign matter) is necessary.

Figure 1A:
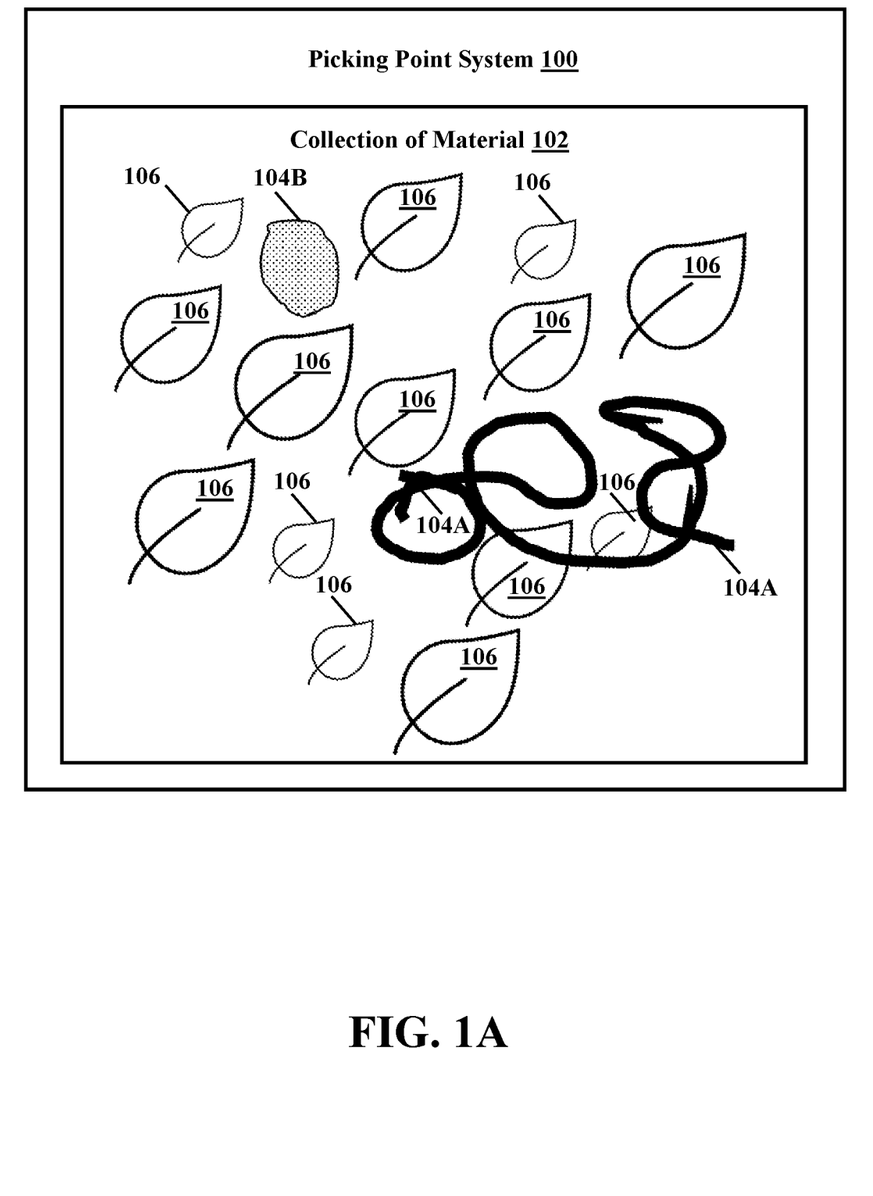
FIG. 1A illustrates an exemplary embodiment of a collection of material, in accordance with embodiments of the present disclosure.

Turning now to the figures, where it is noted that like reference numerals are used to designate like parts in the accompanying drawings, FIG. 1A depicts an exemplary embodiment of picking point system 100 and a collection of material 102, which is comprised of anomalies 104A, 104B, and one or more materials 106, in accordance with embodiments of the present disclosure. Picking point system 100 can be used to generate one or more picking points to remove one or more anomalies (e.g., anomaly 104A, and anomaly 104B) from collection of material 102. FIG. 1A provides an illustration of only one implementation and does not imply any limitation with regards to the environments in which different embodiments may be implemented. Many modifications to the depicted environment may be made by those skilled in the art without departing form the scope of the invention as recited by the claims.

In embodiments, picking point system 100 can be configured to remove one or more anomalies (e.g., anomaly 104A and anomaly 104B) from a collection of material 102 by generating one or more picking points. In embodiments, a picking point can refer to a particular determined location where robotic means, such as a robotic arm, will pick, grasp, swat away, etc. the one or more anomalies (e.g., anomaly 104A and anomaly 104B). As such, picking point system 100 can be configured to generate one or more picking points that are located on the anomaly. A collection of material 102 can include any type or amount of material, such as organic material (e.g., tea leaves and other plant material), inorganic material (e.g., metal components), or any combination thereof. In addition, collection of material 102 can have more than one material type.

For example, collection of material 102 can include a combination of components, such as tea leaves and various herbs, that may be included in a particular final product. Such components may be of varying size and shape within collection of material 102. Collection of material 102 can also include one or more anomalies (e.g., anomaly 104A and anomaly 104B).

As discussed herein, an anomaly can refer to any object that is identified for removal by picking points system 100. In some embodiments, anomalies can be desirable objects collected with other material (e.g., refuse material). For example, collection of material 102 can be composed of one type of material but of varying sizes. In this example, picking points system 100 can be configured to identify material of a particular size as an anomaly and pick or remove the material from the collection of material 102 to be used elsewhere. Such embodiments enable picking point system 100 to sort through the collection of material 102 and identify the objects or anomalies of interests without having to weed through each individual piece of material in collection of material 102. In other embodiments, anomaly (e.g., anomaly 104A and anomaly 104B) can refer to an undesirable object that should be removed (e.g., impurities and/or foreign matter) from collection of material 102.

Returning to the exemplary embodiment illustrated in FIG. 1A, collection of material 102 can include a plurality of objects including, but not limited to anomaly 104A and anomaly 104B, and one or more materials 106. One or more material 106 can be of similar or varying size and can include any number of different materials. Anomalies 104A and 104B, as contemplated herein, can have any kind of shape or configuration. As shown in FIG. 1A, anomaly 104A can be an object that does not have a uniform shape. Anomaly 104A could be any kind of material having a variety of characteristics. For example, anomaly 104A could be malleable, brittle, or fibrous. Using a traditional picking point system would result in generating a failed picking point and anomaly 104A not being removed from collection of material 102. Anomaly 104B, is representative of anomalies having a more uniform shape and those that generally have a small area. While materials 106 are depicted in FIG. 1A as leafy material, such a depiction is only to provide a clear distinction between material 106 and anomalies 104A and 104B, and therefore should not be viewed as limiting.

Figure 1B:
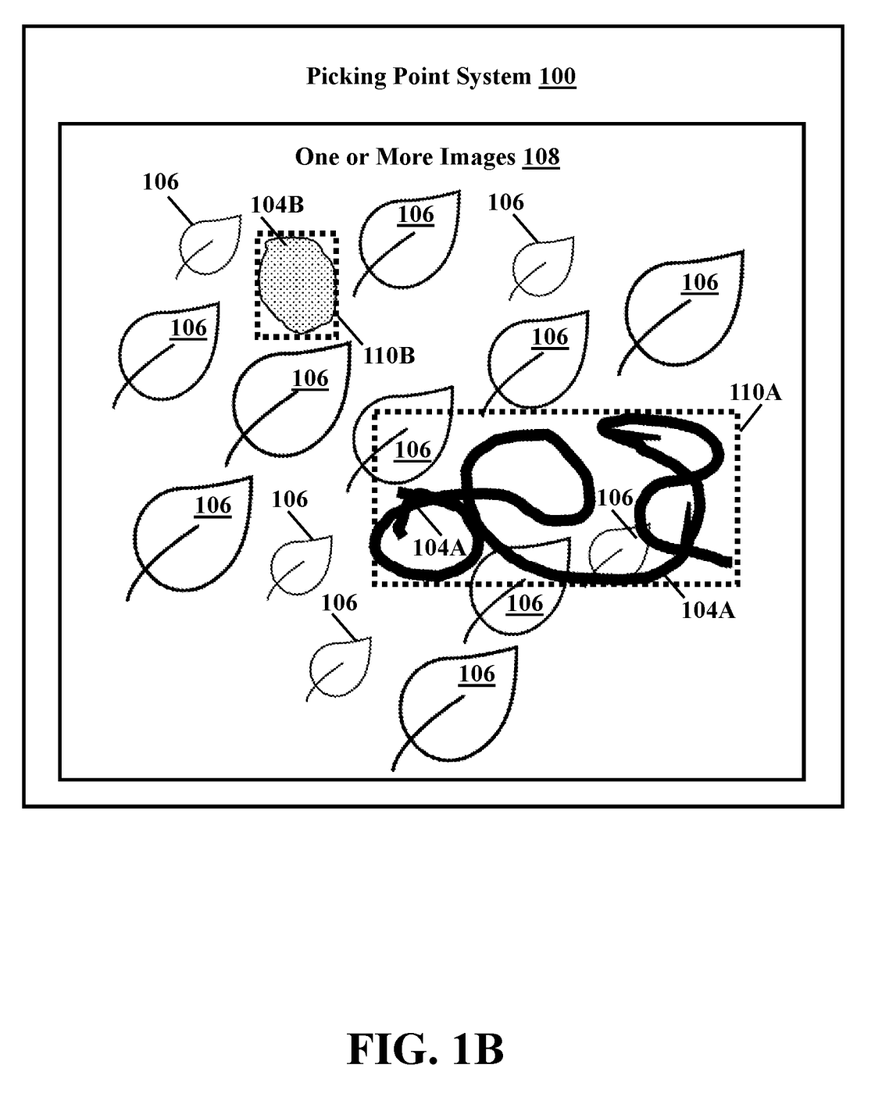
FIG. 1B illustrates an exemplary embodiment of one or more images configured by picking point system, in accordance with embodiments of the present disclosure.

FIG. 1B depicts an exemplary embodiment of picking point system 100, in accordance with embodiments of the present disclosure. Picking point system 100 can generate/identify one or more picking points to remove one or more anomalies (e.g., anomaly 104A, and anomaly 104B) from collection of material 102. In embodiments, picking point system 100 can be configured to capture and/or receive one or more images 108 of the collection of material 102, as referenced in FIG. 1A. FIG. 1B provides an illustration of only one implementation and does not imply any limitation with regards to the environments in which different embodiments may be implemented.

In embodiments, one or more images 108 can be generated using any type of imaging device configured to capture information about the collection of material 102. While in some embodiments a traditional image recognition camera may be used, in other embodiments, other imaging technology can be used or combined with traditional image recognition methods. For example, in some embodiments, the collection of material 102 can be a thick layer of intermixing material and anomalies with little to no opacity. In such embodiments, one or more images 108, captured using a traditional image recognition cameras, may not allow picking point system 100 to determine the necessary parameters associated with the plurality of objects (e.g., bounding box and/or segmentation of anomaly 104A, anomaly 104B, and materials 106). As a result, a secondary method of imaging may be used. One such secondary method of imaging may include, but is not limited to, infrared imaging. In embodiments, infrared imaging can allow picking point system 100 to generate one or more images 108 that are able to distinguish between layers of convoluted material and determine the parameters of the one or more anomalies (e.g., anomalies 104A and 104B), particularly when there are overlapping layers of material in collection of material 102.

In embodiments, picking point system 100 can be configured to use one or more images 108 of collection of material 102 to identify if one or more anomalies (e.g., anomaly 104A and anomaly 104B) are present in the collection of material 102. In embodiments, picking point system 100 be configured to identify if one or more anomalies are present in the collection of material 102 using segmentation analysis methods on the one or more images 108. In these embodiments, picking point system 100 can be configured to perform patch and feature extraction of the one or more image 108 of the collection of material 102.

Using the features extracted, in embodiments, picking point system 100 can be configured to perform various statistical analyses (e.g., principal component analysis (PCA) and k-means clustering). In embodiments, picking point system 100 can determine if the resulting information represents objects/materials that are normal (e.g., material 106) and/or abnormal (e.g., anomalies 104A-104B) within the one or more images 108 of collection of material 102. In embodiments, such determination can be performed by using machine learning capabilities that allows for the resulting information to be compared to a corpus or dictionary. In these embodiments, a corpus or dictionary can include a historical repository, having data associated with what has previously been identified as an anomaly 104 or material 106, and/or a database of provided data (e.g., data provided by an administrator) that can be used to identify distinguishing aspects between a material 106 and anomaly 104A and/or anomaly 104B.

Figure 1C:
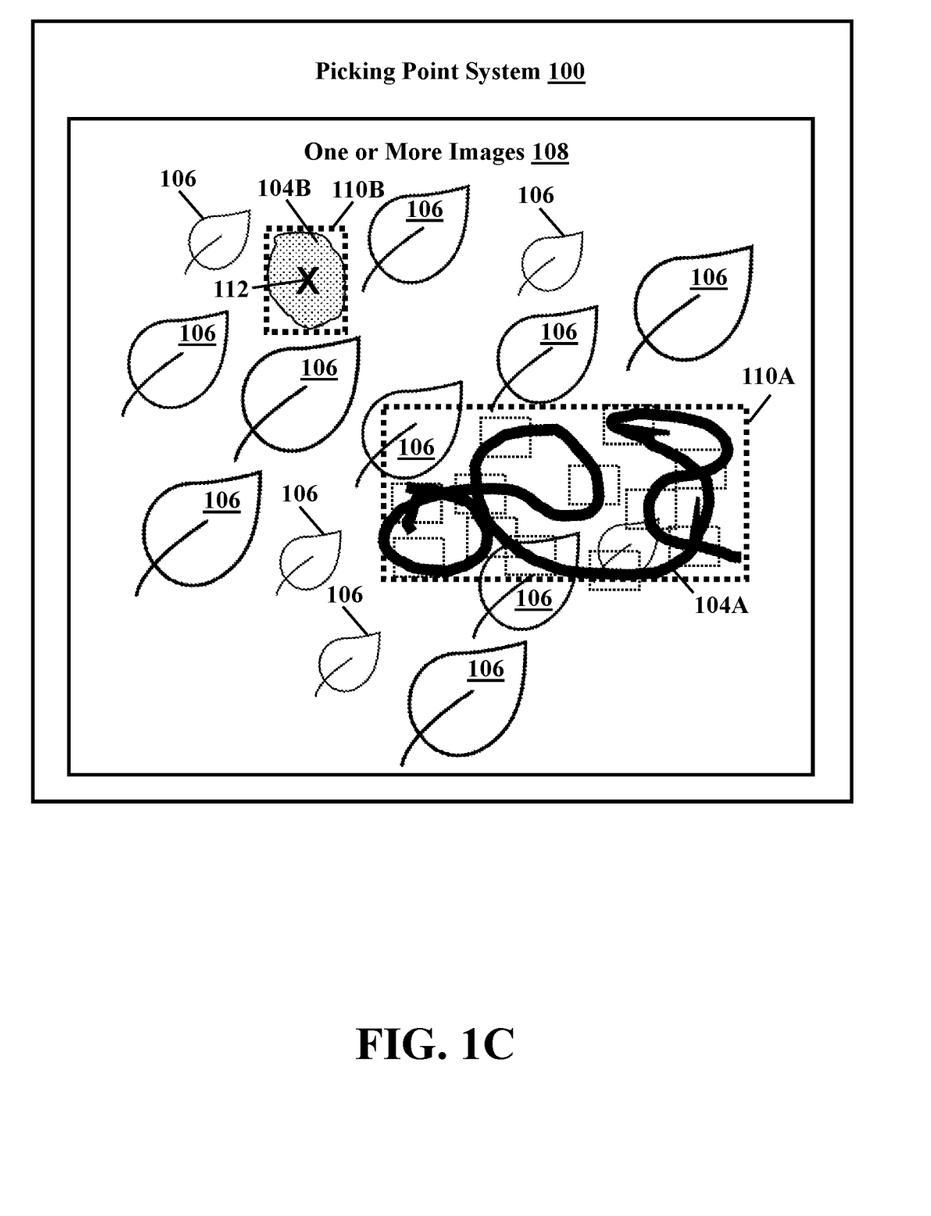
FIG. 1C illustrates an exemplary embodiment of picking point generation, in accordance with embodiments of the present disclosure.

FIG. 1C depicts an exemplary embodiment of picking point system 100, configured to generate a bounding box 110A and 110B for each of the one or more anomalies (e.g., anomaly 104A and anomaly 104B), in accordance with embodiments of the present disclosure.

In embodiments, picking point system 100 can be configured to generate a bounding box for each identified anomaly and determine a threshold area. As shown in FIG. 1B, picking point system 100 can generate a bounding box 110A around anomaly 104A and a bounding box 110B around anomaly 104B. In some embodiments, bounding boxes 110A and 110B can be configured to encompass the entirety of each anomaly 104A and 104B. When comparing the total area associated with anomaly 104A and the total area associated with anomaly 104B, it is likely that the total areas would not be significantly different. However, when comparing the area associated with bounding box 110A and bounding box 110B there is a significant difference due to the configuration and spread of anomaly 104A.

In embodiments, once a bounding box is generated for each identified anomaly (e.g., 104A and 104B), picking point system 100 can compare the area of the bounding box associated with each identified anomaly to a threshold area. While in some embodiments the threshold area can be configured differently depending on the type of anomaly, in other embodiments, one threshold area can be used for each identified anomaly. In embodiments, where the area of the bounding box of a particular anomaly is less than the area of a threshold area, picking point system 100 can be configured to generate a picking point at the center of the particular anomaly's bounding box.

In embodiments, the threshold area can be dependent on various factors including, but not limited to: (i) the type of material in collection of material 102 and previously identified anomalies (e.g., the threshold area could increase/decrease depending on the average size of objects/materials found in collection of material 102); (ii) the likelihood of error associated with the removal means (e.g., the percent error associated with the robotic means may be considered when determining the threshold area); (iii) determining a particular amount of area that is indicative of the anomaly being located at the center of the bounding box, or (iv) or any combination thereof.

In addition, in some embodiments, threshold area can be configured over time based on machine learning principles to ensure the threshold area is of a size that can accurately predict that a picking point at the center of the bounding box will be successful if the size of the bounding box is smaller than the threshold area. In embodiments where one threshold area is used for each identified anomaly, the threshold area is often a small area. In these embodiments, determining a bounding box of an anomaly has a smaller area than a threshold area ensures that a picking point system 100 can generate a picking point at the center of the bounding box and the picking point will be on the anomaly.

Returning to FIG. 1C, picking point system 100 has compared the area of bounding box 110B of anomaly 104B to a threshold area and has determined that bounding box 110B has a smaller area than the determined threshold area. As such, picking point system 100 can generate picking point 112 in the center of anomaly 104B. In embodiments, picking points generated as a result of the area of a bounding box being less than a threshold area are not only located on the anomaly, but are often generated at the barycenter or balancing point of the anomaly. Generating picking point 112 at the barycenter or balancing point can ensure that the weight of anomaly 104B is equally distributed during removal. Equally distributing or closely distributing the weight of anomaly 104B can ensure that anomaly 104 is mostly or entirely removed from collection of material 102. If a picking point was generated at a position other than the balancing point of the anomaly, such positioning could cause stress on the structure of the anomaly and could result in the anomaly breaking. If an anomaly breaks during the removal process, removal becomes more difficult and decreases efficiency associated with picking point system 100.

In embodiments, where the area of the bounding box of a particular anomaly is greater than the area of a threshold area, picking point system 100 can be configured to generate one or more picking points on the anomaly (as depicted in FIG. 1C with the smaller dashed boxes within 110A). In these embodiments, picking point system 100 can generate one or more picking points on the anomaly by computing one or more segmentation analyses of the one or more images 108. While in some embodiments, the segmentation analysis performed during anomaly detection can be repurposed for generating picking points on an anomaly, in other embodiments a secondary segmentation analysis may be performed to generate the picking points.

In embodiments, the segmentation analysis can provide information in the form of segments associated identifying the location parameters of the anomaly. In embodiments, segmentation analyses can include one or more segments of the anomaly is comprised of points. In these embodiments, picking points system 100 can observe the points and determine if a cluster of points exists. Picking points system 100 can be configured to classify/identify a cluster of points as a connected area.

In embodiments, the segmentation analyses can include one or more segments of the anomaly that are comprised of one or more polygons. In embodiments where the one or more segments include one or more polygons, picking point system 100 can be configured to classify/identify that each of the one or more polygons is a connected area (such as each of the smaller dashed boxes within/of 110A). While in some embodiments each polygon is a connected area, in other embodiments two or more polygons may be identified as a connected area. In embodiments, a segmentation analysis can be comprised of either points or polygons, or in some embodiments, both points and polygons.

As a result of the area of bounding box 110A of anomaly 104A being larger than the threshold area, picking point system 100 can be configured to perform segmentation analysis on anomaly 104A and determine where one or more connected areas should be identified on anomaly 104A. In the exemplary embodiment provided in FIG. 1C, connected areas associated with anomaly 104A are represented with a variety of small dashed boxes located on the anomaly 104A. In embodiments, picking points system 100 can generate one or more picking points on the identified anomaly at each identified connected area. While in some embodiments, there is only one picking point generated, in other embodiments, picking point system 100 can compute any number of picking points necessary to remove the anomaly. In embodiments, one or more picking points can be generated ensure the structural integrity of anomaly 104A is maintained throughout the removal process. For example, picking point system 100 can consider anomaly 104A's various balance centers when generating picking points to ensure the weight of anomaly 104A is equally distributed.

In embodiments, picking point system 100 can be configured to remove the anomaly from the collection of material 102 via the generated one or more picking points found from the one or more images 108. Picking point system 100 can configure various types of removal means during removal. In some embodiments, removal means (e.g., any kind of robotic means) can be configured to simultaneously pick or grasp each of the one or more picking points generated for a particular anomaly. While removal means can include any type of mechanical device capable of removing the one or more anomalies, in many embodiments, the anomalies are removed via robotic means (e.g., a robotic arm) configured by picking point system 100 to remove the one or more anomalies at the generated picking points.

Figure 2:
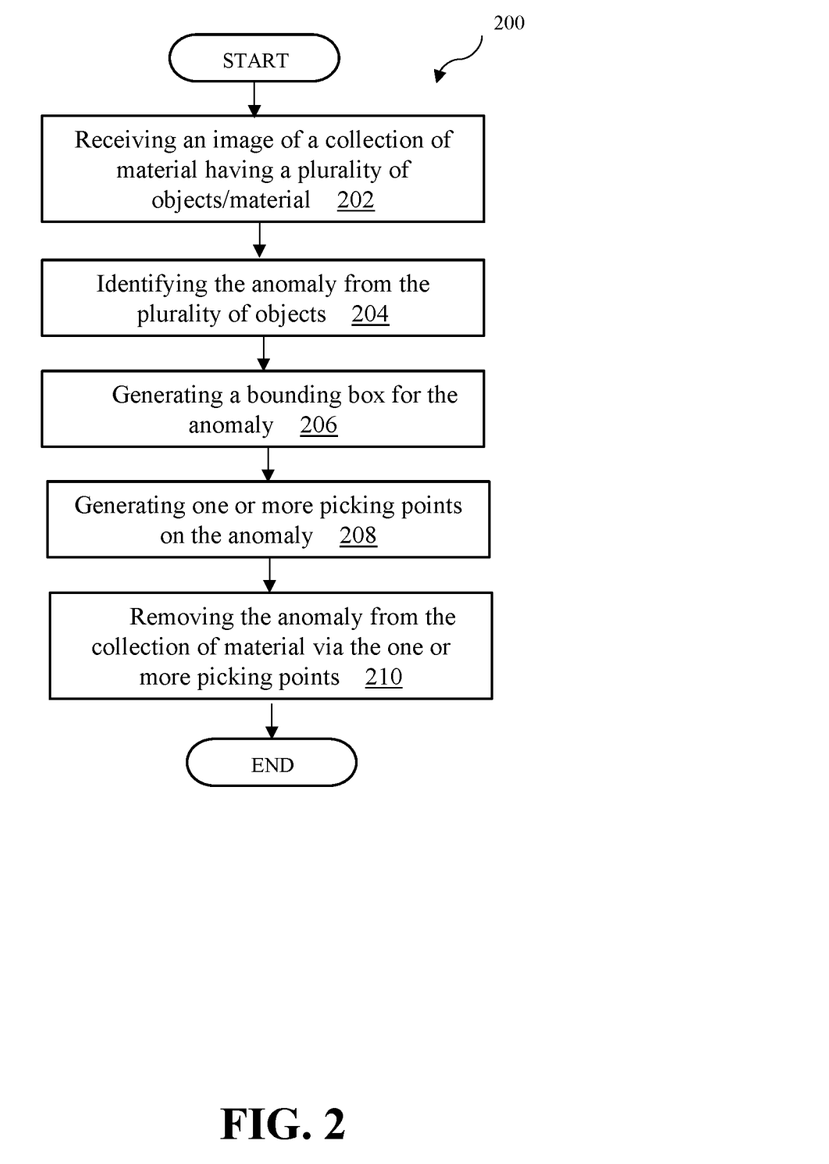
FIG. 2 illustrates a flowchart of a method for removing an anomaly from a collection of material, in accordance with embodiments of the present disclosure.

Referring now to FIG. 2, a flowchart illustrating an example method 200 for generating picking points of an anomaly, in accordance with embodiments of the present disclosure. In some embodiments, the method 200 may be used to identify anomalies and generate picking points that can allow the anomaly to be accurately and completely removed from a collection of material.

In some embodiments, the method 200 begins at operation 202 where a processor receives an image of the collection of material having a plurality of objects/material. The method 200 proceeds to operation 204. At operation 204, the processor identifies the anomaly from the plurality of objects. The method 200 proceeds to operation 206. At operation 206, the processor generates a bounding box for the anomaly. The method 200 proceeds to operation 208. At operation 208, the processor generates one or more picking points on the anomaly. The method 200 proceeds to operation 210. At operation 210, the processor removes the anomaly form the collection of material via the one or more picking points on the anomaly. In some embodiments, as depicted inf FIG. 2, after operation 210, the method 200 may end.

In some embodiments, discussed below, there are one or more operations of the method 200 that were not depicted for the sake of brevity with operations/steps further performed by the processor.

Accordingly, in embodiments, the processor may compare the area of the bounding box to a threshold area. In embodiments, responsive to comparing the area of the bounding box to the threshold areas, the processor may determine the area of the bounding box is less than a threshold area. In these embodiments, the processor may generate one or more picking points at the center of the bounding box.

In embodiments, responsive to comparing the area of the bounding box to the threshold, the processor may determine the area of the bounding box exceeds a threshold area. In embodiments, the processor may compute one or more segmentation of the anomaly and analyze the one or more segmentations. In embodiments, responsive to analyzing the one or more segmentations, the processor may identify the one or more segmentations is comprised of points. In these embodiments, the processor may also determine if a cluster of points is a connected area.

In embodiments, responsive to analyzing the one or more segmentations, the processor may identify that the one or more segmentations is comprised of one or more polygons and determine each of the one or more polygons is a connected area. In embodiments, the processor, while generating the one or more picking points on the anomaly, may identify one or more connected areas on the anomaly and compute the number of the one or more picking points for the one or more connected areas. In embodiments, the processor, while removing the anomaly from the collection of material via the one or more picking points, may simultaneously pick or grasp at the one or more picking points with robotic means.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
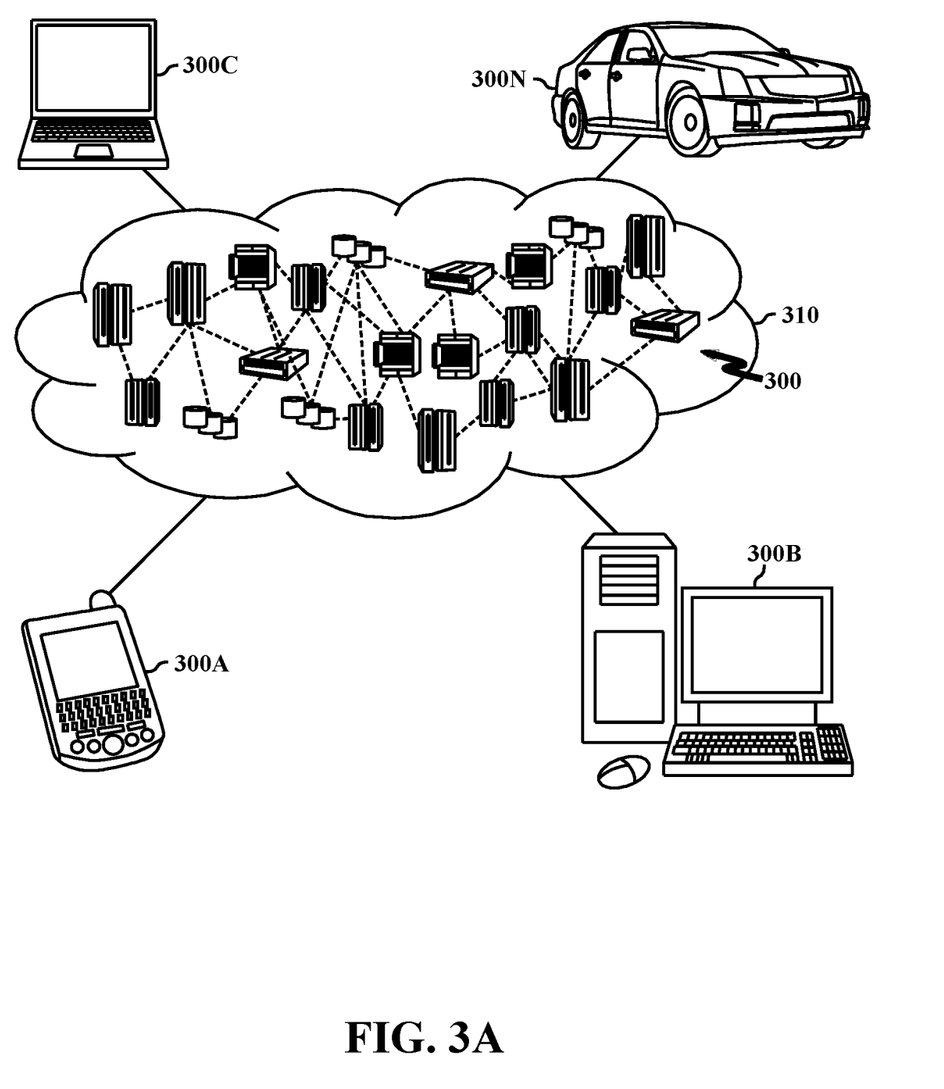
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
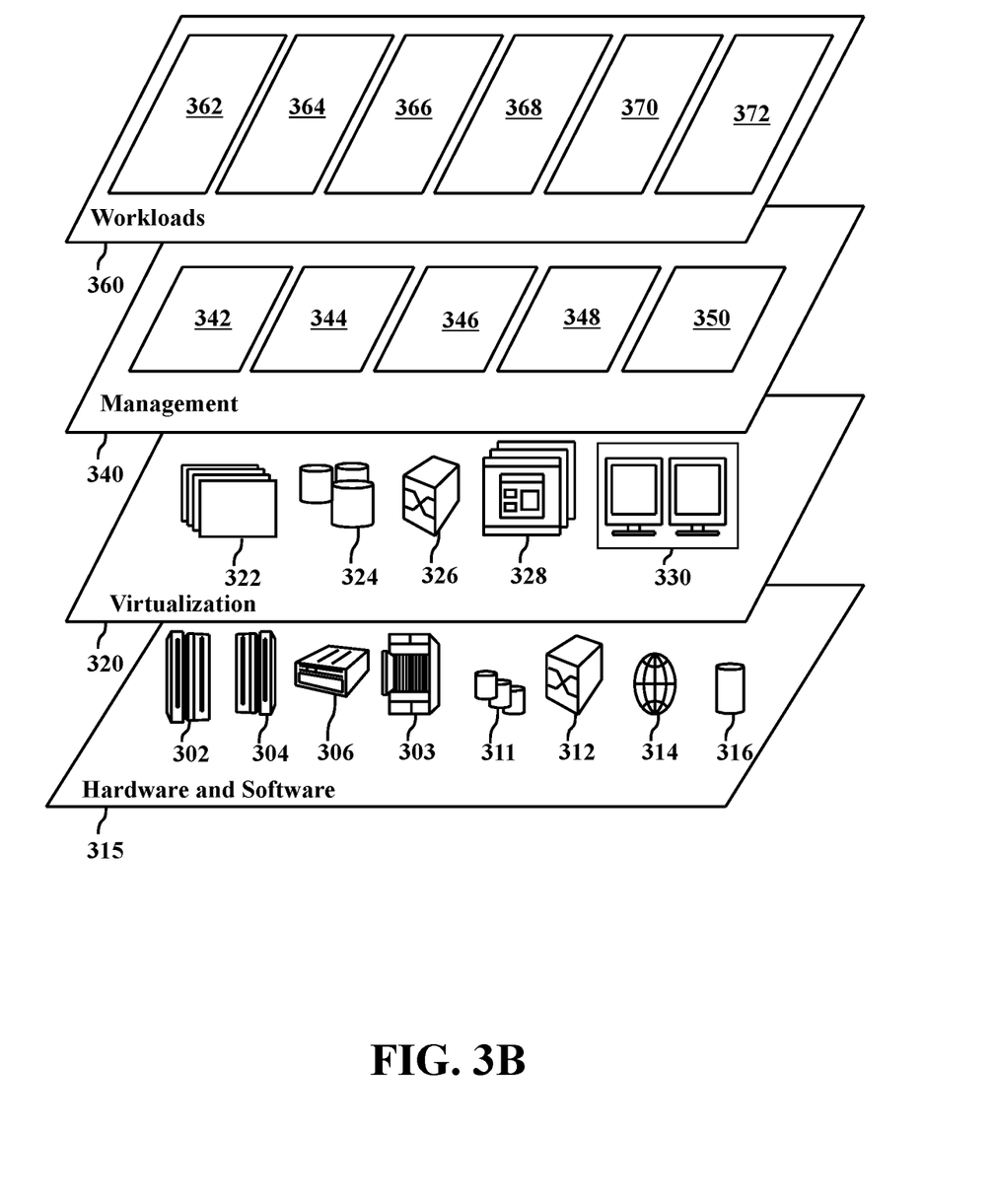
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and picking point generation 372.

Figure 4:
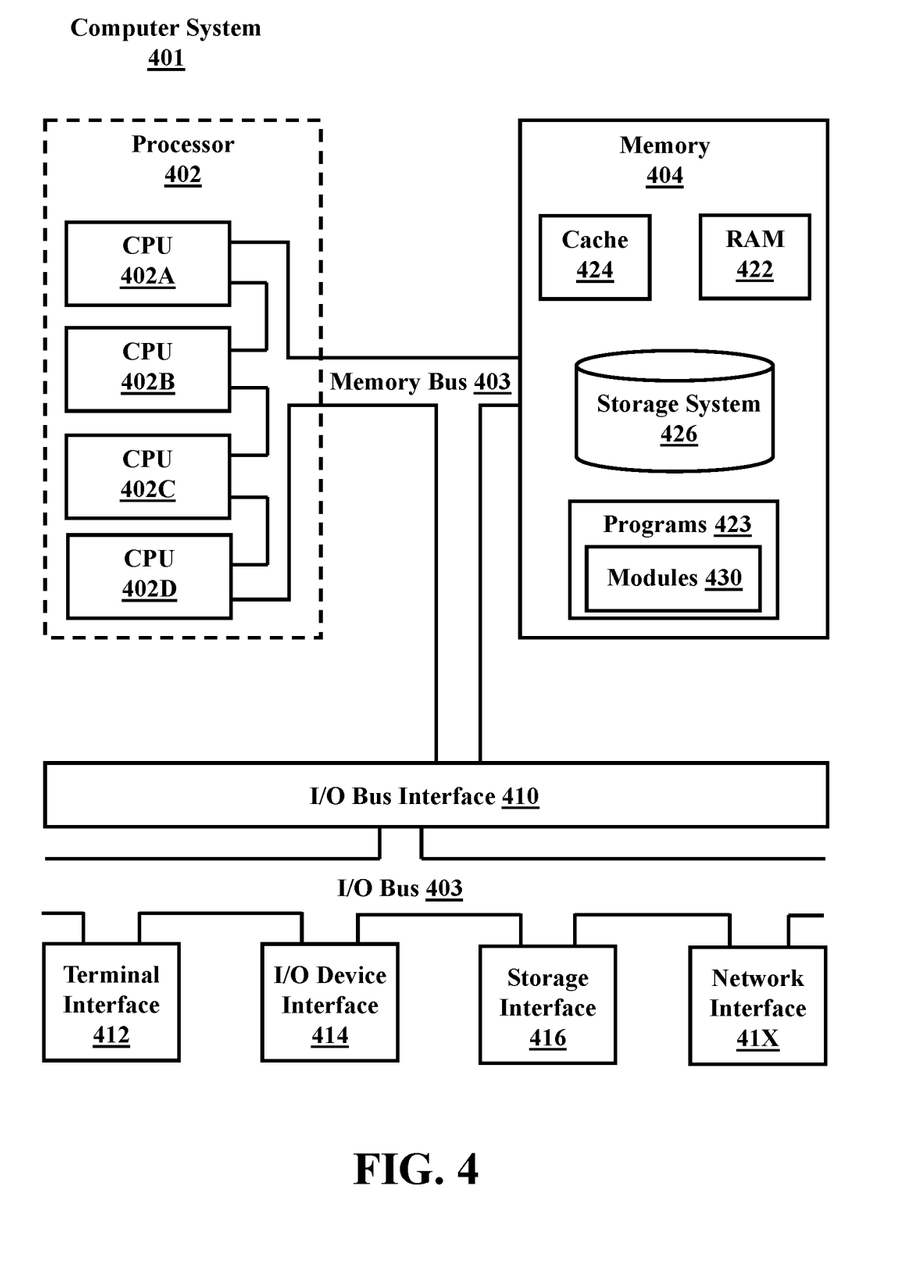
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for removing an anomaly in a collection of material, the method comprising:
   receiving, by a processor, an image of the collection of material having a plurality of objects;
   performing, by the processor, patch and feature extraction of the image to extract features from the image;
   identifying, using segmentation analysis, the anomaly from the plurality of objects based on principle component analysis and k-means clustering of the features extracted from the image;
   generating a bounding box for the anomaly;
   determining a threshold area around the anomaly, based on a set of factors selected from the group consisting of (i) a material of the anomaly, (ii) a size of the anomaly, (iii) a likelihood of error associated with a means for removing the anomaly, and (iv) determining a particular amount of area indicative of the anomaly being located at a center of the bounding box;
   generating a determined plurality of picking points on the anomaly, wherein the determined plurality of picking points are configured on at least one balance point of the anomaly such that a weight of the anomaly at the determined plurality of picking points is equally distributed between the determined plurality of picking points and wherein the determined plurality of picking points ensure a structural integrity of the anomaly while removing the anomaly;

configuring one or more robotic means to remove the anomaly from the collection of material based on the determined plurality of picking points; and removing the anomaly by grasping the anomaly at the determined plurality of picking points using the one or more robotic means.

2. The method of claim 1, wherein the generating the bounding box for the anomaly further includes: comparing an area of the bounding box to the threshold area.

3. The method of claim 2, further including determining, responsive to comparing the area of the bounding box to the threshold area, that the area of the bounding box exceeds the threshold area.

4. The method of claim 3, wherein the generating the determined plurality of picking points on the anomaly further includes:

computing one or more segmentations of the anomaly; and analyzing the one or more segmentations.

5. The method of claim 4, wherein the method further comprises:

identifying, responsive to analyzing the one or more segmentations, that the one or more segmentations is comprised of points; and determining a cluster of points is a connected area.

6. The method of claim 4, wherein the method further comprises:

identifying, responsive to analyzing the one or more segmentations, that the one or more segmentations is comprised of one or more polygons; and determining each of the one or more polygons is a connected area.

7. The method of claim 2, further including determining, responsive to comparing the area of the bounding box to the threshold area, that the area of the bounding box is less than the threshold area, and generating at least one of the determined plurality of picking points on the anomaly at a barycenter of the anomaly.

8. The method of claim 1, wherein the generating the determined plurality of picking points on the anomaly further includes:

identifying one or more connected areas on the anomaly; and computing a number of the determined plurality of picking points for the one or more connected areas.

9. The method of claim 8, wherein the removing the anomaly from the collection of material based on the determined plurality of picking points, further includes:

capturing, by the processor, the image of the collection of material having the plurality of objects using an image recognition camera.

10. The method of claim 1, wherein the determined plurality of picking points are configured on a plurality of balance points of the anomaly such that a weight of the anomaly at the determined plurality of picking points is equally distributed between the determined plurality of picking points.

11. A system for removing an anomaly in a collection of material, the system comprising:

a memory; and a processor in communication with the memory, the processor being configured to perform operations comprising:

receiving an image of the collection of material having a plurality of objects;

performing patch and feature extraction of the image to extract features from the image;

identifying, using segmentation analysis, the anomaly from the plurality of objects based on principle component analysis and k-means clustering of the features extracted from the image;

generating a bounding box for the anomaly;

determining a threshold area around the anomaly, based on a set of factors selected from the group consisting of (i) a material of the anomaly, (ii) a size of the anomaly, (iii) a likelihood of error associated with a means for removing the anomaly, and (iv) determining a particular amount of area indicative of the anomaly being located at a center of the bounding box;

generating a determined plurality of picking points on the anomaly, wherein the determined plurality of picking points are configured on at least one balance point of the anomaly such that a weight of the anomaly at the determined plurality of picking points is equally distributed and wherein the determined plurality of picking points ensure a structural integrity of the anomaly while removing the anomaly;

configuring one or more robotic means to remove the anomaly from the collection of material based on the determined plurality of picking points; and removing the anomaly by grasping the anomaly at the determined plurality of picking points using the one or more robotic means.

12. The system of claim 11, wherein the generating the bounding box for the anomaly further includes: comparing an area of the bounding box to the threshold area.

13. The system of claim 12, wherein the operations performed by the processor further includes:

determining, responsive to comparing the area of the bounding box to the threshold area, that the area of the bounding box exceeds the threshold area.

14. The system of claim 13, wherein the generating the determined plurality of picking points on the anomaly further includes:

computing one or more segmentations of the anomaly; and analyzing the one or more segmentations.

15. The system of claim 14, wherein the operations performed by the processor further includes:

identifying, responsive to analyzing the one or more segmentations, that the one or more segmentations is comprised of points; and determining a cluster of points is a connected area.

16. The system of claim 14, wherein the operations performed by the processor further includes:

identifying, responsive to analyzing the one or more segmentations, that the one or more segmentations is comprised of one or more polygons; and determining each of the one or more polygons is a connected area.

17. The system of claim 11, wherein the generating the determined plurality of picking points on the anomaly further includes:

identifying one or more connected areas on the anomaly; and computing a number of the determined plurality of picking points for the one or more connected areas.

18. The system of claim 17, wherein the removing the anomaly from the collection of material based on the determined plurality of picking points, further includes:

capturing, by the processor, the image of the collection of material having the plurality of objects using an image recognition camera.

19. A computer program product for removing an anomaly in a collection of material, the computer program product comprising a computer readable storage medium having program instructions embodied therewith, the program instructions executable by a processor to cause the processor to perform a function, the function comprising:

receiving an image of the collection of material having a plurality of objects;

performing patch and feature extraction of the image to extract features from the image;

identifying, using segmentation analysis, the anomaly from the plurality of objects based on principle component analysis and k-means clustering of the features extracted from the image;

generating a bounding box for the anomaly;

determining a threshold area around the anomaly based on a size of the anomaly;

generating a determined plurality of picking points on the anomaly, wherein the determined plurality of picking points are configured on at least one balance point of the anomaly such that a weight of the anomaly at the determined plurality of picking points is equally distributed and wherein the determined plurality of picking points ensure a structural integrity of the anomaly while removing the anomaly;

configuring one or more robotic means to remove the anomaly from the collection of material based on the determined plurality of picking points; and removing the anomaly by grasping the anomaly at the determined plurality of picking points using the one or more robotic means.

20. The computer program product of claim 19, wherein the program instructions for generating the bounding box for the anomaly further includes: comparing an area of the bounding box to the threshold area.

* * * * *